United States Patent [19]
Waligorski

[11] 4,144,109
[45] Mar. 13, 1979

[54] ULTRASONIC WELDING OF PLASTIC MEMBERS

[75] Inventor: Gordon J. Waligorski, South Haven, Mich.

[73] Assignee: Desco Corporation, Milwaukee, Wis.

[21] Appl. No.: 837,536

[22] Filed: Sep. 28, 1977

[51] Int. Cl.² .............................................. B29C 27/08
[52] U.S. Cl. .................................................... 156/73.1
[58] Field of Search .......................... 156/73.1; 264/23; 228/110

[56] References Cited

U.S. PATENT DOCUMENTS

| | | | |
|---|---|---|---|
| 3,775,189 | 11/1973 | Jaggard | 156/73.1 |
| 3,966,520 | 6/1976 | Fallenbeck et al. | 156/73.1 |
| 4,003,665 | 1/1977 | Dreyer et al. | 156/73.1 |

OTHER PUBLICATIONS

Information Sheet PW-5, Ultrasonic Stud Welding, Branson Sonic Power Co., Dunbury, Conn., 1/73.

*Primary Examiner*—Douglas J. Drummond
*Attorney, Agent, or Firm*—Andrus, Sceales, Starke & Sawall

[57] ABSTRACT

A microwave oven thermometer unit has polysulfone plate with a glass tube secured to the plate by a pair of mounting polysulfone straps. A method of welding the straps to the plate includes forming each of the strap ends with a stud member having a diameter larger than an opening in the plate. The studs and openings are aligned and ultrasonic energy applied, simultaneously with pressure to force the studs into the openings to form a weld. The different sizes of the stud and opening creates weld flash moving in front of the first member and also outwardly of the opening, which has an encircling recess to receive the weld flash.

The stud member is formed with an enlarged head overlying an encircling recess and weld flash deposited therein.

4 Claims, 5 Drawing Figures

ULTRASONIC WELDING OF PLASTIC MEMBERS

BACKGROUND OF THE INVENTION

The present invention relates to a method of ultrasonically welding a first thermoplastic member within an opening in a second thermoplastic member and to fabricating a microwave oven thermometer employing such method.

Various products may include two or more plastic elements which are to be permanently joined or interconnected. Such plastic elements can be interconnected by the use of a suitable adhesive or, by appropriate selection of material and processes, directly integrally bonded or welded to each other. For thermoplastic elements, ultrasonic welding is often employed wherein the members are mounted in engagement and coupled to an ultrasonic welding electrode or horn. In accordance with well-known processes, the horn, in turn is coupled to an electroacoustical energy source to establish high frequency vibratory motion of the coupled elements. The high frequency vibration results in the softening of the thermoplastic material, and a welding of the two elements upon terminating of the vibration and hardening of the softened or molten plastic materials. Generally the parts or elements are carefully formed and fitted in order to produce high strength joints. This, of course, requires careful and costly manufacturing and assembly processes for mass produced and particularly low cost items, it would be desirable to eliminate the necessity for expensive forming of the component parts and permit component manufacture with relatively large tolerances.

For example, microwave oven thermometers generally include a glass thermometer stapled to a metal support. In an operating oven the microwave energy would generally be reflected by the metal support and arcing with the magnetron tube may result. The possible damage to the tube which would result from the arcing prevents insertion of the thermometer during oven operation. In use therefore, the operator must turn off the oven, insert the thermometer and then remove the thermometer before again turning on the oven. Certain plastics such as polysulfone are not destroyed or adversely effected by microwave energy and may support a glass thermometer within an operating microwave oven. The glass tubing generally is formed with a relatively wide tolerance on the order of 0.037 inches. In attaching the glass tube to a plastic support, the structure and process should accomodate such wide tolerances.

SUMMARY OF THE PRESENT INVENTION

The present invention is directed to the method of ultrasonic welding of thermoplastic members such as polysulfone to form a high strength interconnection between component members having large size tolerances and particularly ultrasonic welding of a first member within an opening in a second member such as in a unique microwave oven thermometer having a glass tube thermometer clamped to a plastic support plate. Generally in accordance with the present invention, the first thermoplastic member is larger than the opening in the second thermoplastic member. The first and second members are coaxially aligned within an ultrasonic welding apparatus adapted to force the first and second member into telescoped relationship. In accordance with a preferred and unique mode of carrying out the present invention, the ultrasonic energy is turned on and the welding process initiated and continued until a given clamp-up pressure is created, at which point the welding is terminated. During the welding process, the larger diameter of the first member and the related smaller diameter of opening in the second member forms weld flash, some of which moves in front of the first member and some of which extends rearwardly and outwardly from the inlet end of the opening. The relative diameter of the members provides material necessary for effecting a firm high strength ultrasonic weld joint.

In accordance with a further aspect of the invention, the first member is formed with an enlarged outer portion and the second member is formed with an encircling recess. The outer flash is thus deposited within the recess behind the enlarged portion of the first member. This creates a cover over the recessed flash welded area to maintain a pleasing outer appearance of the first and second members.

More particularly, as applied to a microwave oven thermometer, a plastic plate-like member of polysulfone or the like, is formed with a stepped cylindrical opening to the opposite sides of the glass tube location. A pair of mounting straps of polysulfone are preformed to overly the glass tube with welding studs aligned with the openings. Each stud of a substantially larger diameter than the support clamp opening. The stud is also provided with a small end projection for guiding the stud into the opening. Each opening recess is larger than the stepped guide but smaller than the welding stud. The assembly of the plate-like member, glass tube and two mounting straps are mounted in stacked relation within an ultrasonic welding apparatus having horns engaging each of the strap ends and adapted to establish maximum pressure on the horn. The apparatus is turned on and the welding continued until the clamp-up pressure reaches the selected level, after which the ultrasonic unit is turned off and the molten material allowed to solidify to effect the desired firm weld of the straps to the base member and associated firm clamping of the thermometer tube in position. The forced engagement of the mismatch studs and openings produces a relatively large and firm weld area with the straps overlying the flash recess to maintain an esthetically pleasing support plate. The method and structure produces a low cost oven thermometer which can be employed in an operating microwave oven.

BRIEF DESCRIPTION OF THE DRAWING

The drawing furnished herewith illustrates a preferred construction of the present invention in which the above advantages and features are clearly disclosed as well as others which will be readily understood from the following description and which discloses the best mode presently contemplated by the inventor for carrying out the present invention.

In the drawing.

DESCRIPTION OF THE ILLUSTRATED EMBODIMENT

Figure 1:
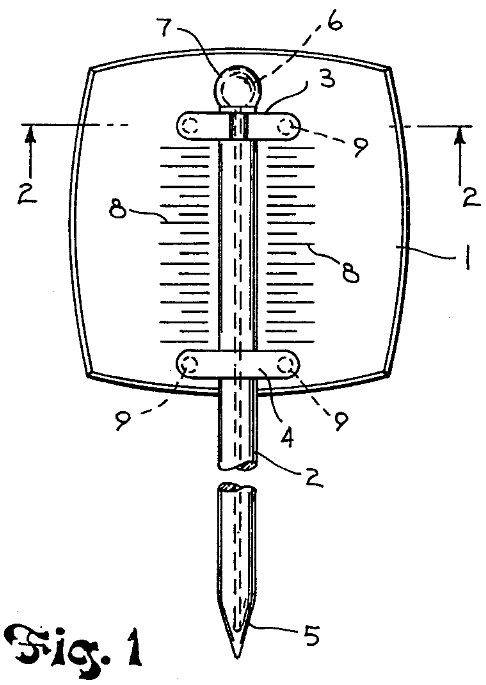
FIG. 1 is a pictorial view of a microwave oven thermometer.
Figure 2:
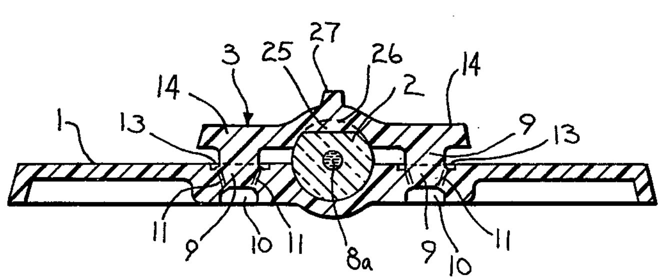
FIG. 2 is an enlarged vertical section taken generally on line 2—2 of FIG. 1.

Referring to the drawings and particularly to FIGS. 1 and 2, the present invention is shown applied to a microwave oven thermometer device including a supporting base plate 1. A glass thermometer tube 2 is provided having the end located within a groove in the base plate and secured in place onto the base plate 1 by a pair of clamping straps 3 and 4. The straps 3 and 4 similarly extend over the glass tube 2 with the opposite ends similarly secured to plate 1, as hereinafter described, to firmly clamp and support tube 2 on plate 1. The thermometer tube 2 projects outwardly from the base plate 1 with the outer end generally tapered to form a pointed end 5 suitable for insertion into meat and the like to be cooked with a microwave oven, not shown. The thermometer serves to read the temperature of the food. The base plate 1 is formed with an opening 6 within which a top-end 7 of tube 2 is located. The outer surface of the base plate 1 is formed with suitable scales 8 for reading of the temperature. In order to employ the thermometer within a microwave oven the several components must not be destructed by or otherwise adversily interact with microwave energy. Tube 2 is a conventional glass tube having a small coaxial opening filled with a suitable temperature responsive oil 8*a*. The glass tube 2 and the temperature sensitive oil 8*a* are not affected by the microwave energy. The conventional metal plate is of course unacceptable because of the adverse affect during oven operation, such as possible arcing with the magnetron tube, not shown. Although a glass plate could be employed, such material would not provide a practical, low cost construction. Polysulfone is a known thermoplastic and in fact is not adversely affected by microwave energy and does not interact with other elements of art within the oven as disclosed in the cross-referenced application. Further such material does not entrap fluid such as moisture which could create a potential damaging condition. The plate 1 and straps 3 and 4 are thus formed of polysulfone.

In the mass production of thermometer glass tubing 2, relatively wide forming tolerances are required to allow rapid formation and to minimize the cost. As a result, the clamping straps 3 and 4 and the connection thereof to plate 1 must accomodate such relatively large tolerances.

The present invention is particularly directed to an ultrasonic welding method for joining of plastic parts such as interconnecting the glass support straps 3 and 4 to the decorative base plate 1. The base plate 1, the glass tube 2 and the like are not further described other than as necessary to a clear and full understanding of the present invention, because any standard or desired components can be employed.

Figure 3:
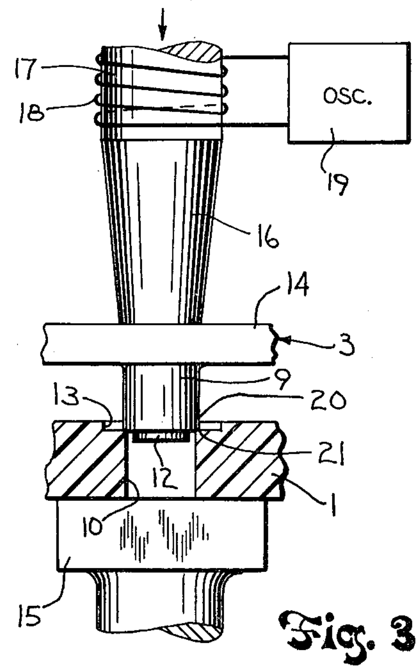
FIG. 3 is an enlarged fragmentary and vertical section showing the separate components of the thermometer assembled and aligned in ultrasonic welding apparatus.
Figure 4:
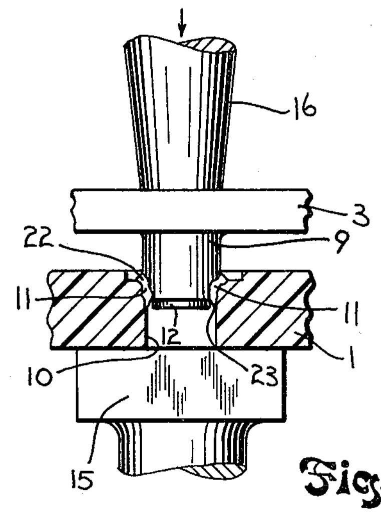
FIG. 4 is a view showing the initial welding process.
Figure 5:
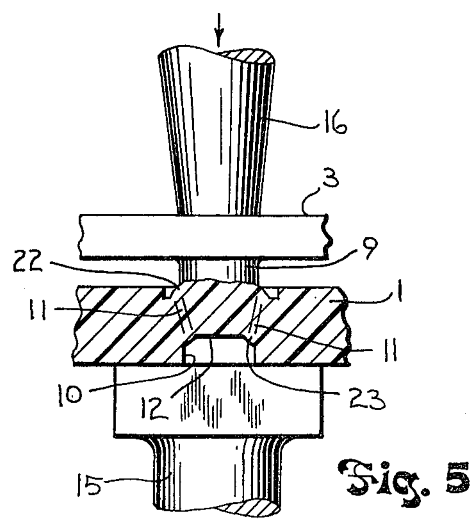
FIG. 5 is a view similar to FIG. 4 showing the final welded components.

The support straps 3 and 4 are similarly formed as separate components, as shown in FIG. 2. Each strap 3 and 4 has a welding stud 9 projecting from the opposite ends thereof. The studs 9 project into and are secured within an opening 10 in the support plate 1 by thermal welds 11. An enlarged view of one stud 9 and opening 10 is shown in FIGS. 3–5 to illustrate a unique method of welding in place in accordance with this invention.

In accordance with the teaching of the present invention, the stud 9 is of a diameter which is slightly larger than the opening 10 in the base plate 1. The stud 9 includes a bottom guide or projection 12 of a diameter similar to the diameter of the opening 11 for initial guiding and aligning of the stud 9 within the opening 10, as shown in FIG. 3.

The opening 10 is provided with an outer encircling recess 13 on the stud entrance surface. The cross-section of recess 13 is preferably smaller than the outer extension or enlarged end 14 of the strap 3 and in the final welded assembly, the recess 13 is masked or hidden behind such strap end 14, for reasons hereinafter described.

The strap 3 and base plate 1 are assembled with the glass tube 2 in stacked relation and mounted in a suitable ultrasonic welding apparatus. Such apparatus is well-known and is diagrammatically illustrated in FIGS. 3–5 applied to the one end of strap 3. In actual practice, the studded ends of straps 3 and 4 would be simultaneously welded as described for the single stud of FIGS. 3–5.

Thus, the stacked assembly is mounted with the base plate 1 resting on suitable support plate 15. A movable sonotrode or horn 16 is moved downwardly onto the strap end in alignment with the stud 9. The horn 16 is coupled to a suitable oscillator driven vibratory source which is diagrammatically illustrated as a core member 17 having an electromagnetic winding 18 wound thereon. The winding 18 is energized from a high frequency oscillator 19, resulting in magnetically generated vibratory movement of the horn 16. The horn 16 vibrating at an ultrasonic frequency, exerts a rhythmically oscillating pressure on the stacked assembly.

As is well-known, such ultrasonic energy is transformed into heat within the members stud 9 and the edge of opening 10 and particularly at the concentrated, small interengaging surfaces. The heat generated in the thermoplastic rapidly converts it into a highly softened moltened state. Simultaneously in accordance with the present invention, a constant downward pressure is superimposed on the horn 16 simultaneously with the continued heating. The softened or molten plastic allows stud 9 to move inwardly into the opening 10 with the edge 20 of the stud 8 being deformed and the engaged edge 21 of the opening 9 being simultaneously and similarly deformed, as shown in FIG. 4, to define the formation of weld area 11, with the mismatched stud and opening providing material necessary for effecting a high strength weld.

The level of back pressure available at the horn 16 will slowly increase as the weld area increases from the initial area shown in FIG. 4 to the final relatively large area shown in FIG. 5. The extend of the projection of stud 9 into opening 10 may vary over a relatively wide range and still produce a firm and reliable welded connection.

During the welding process, weld flash developed by the enlarged stud 9 and relatively small opening 10, is partially pushed forwardly within the opening and ahead of the stud 9 as at 22 and partially rearwardly into the encircling recess 13 in the base plate 1, as at 23. The end 14 of strap 3 is formed with an appropriate size tc cover the recess 13 and therefore the flash 23. The decorative surface including scale 8 is thus maintained aesthetically pleasing. If the flash 23 were allowed to spill over directly onto the surface it would tend to discolor any decorative material. The flash 23 is contained within the opening 10 and thus effectively hidden.

The welding is terminated with the strap 3 spaced slightly from the decorative face or top of the plate 1. The spacing again can vary over a wide range without distracting from the appearance of the final product. For example, in a practical embodiment the spacing varied between 0.050 to 0.090 inch. The weld which results is a solid and strong weld as a result of the welding action provided by the large stud 9 and relatively small opening 10.

A very convenient and reliable method of controlling the weld cycle holds the ultrasonic energy supply on and the welding operation continues until a preselected back pressure is created in the weld area 11. The back pressure can be sensed by any suitable means coupled to the welding apparatus such as the horn. At that time, the oscillator is turned off and the molten plastic allowed to cool to form weld 11. The weld can thus occur over a long path permitting a large tolerance in the forming of the parts which is taken up in creating the high strength ultrasonic weld.

In FIGS. 4 and 5, the weld area and material 11 is delineated by generally parallel lines for purposes of illustration only. In fact, the stud 9 and base plate 1 merge into a single integral mass and thermal weld, providing a firm attachment of the strap to the plate 1.

While the foregoing description clearly sets forth a preferred and best mode as presntly contemplated by the inventor for ultrasonic welding of a first member within an opening in a second member and particularly for forming a microwave oven thermometer, various modification and changes can obviously be made without deviating from the significant teaching of the present invention, the scope of which is limited solely by the definition set forth in the appended claims.

Various modes of carrying out the invention are contemplated as being within the scope of the following claims, particularly pointing out and distinctly claiming the subject matter which is regarded as the invention.

I claim:

1. In the process of producing an article having a glass tube comprising the method of clamping said glass tube to a plastic base plate comprising the steps of forming at least one clamping strap with a welding stud of a preselected diameter at each end and with an outer enlarged portion encircling each stud, forming said base plate with openings spaced to the opposite sides of the tube in accordance with the studs on said clamping strap and with an encircling recess about each opening, each of said openings having a slightly smaller diameter than said studs, centering and assembling in stacked relation in the strap overlying the glass tube with the studs aligned with and engaging the edge of said openings in said base plate, subjecting the ends of said straps and base plate to ultrasonic vibratory energy to cause said studs and edges of said openings to soften and partially melt, applying pressure across said support and said base plate to force said stud into said opening with the displacement of the softened plastic material including partial displacement outwardly of the opening into the adjacent recess to develop a generally conically configured weld interface, thereafter terminating the application of ultrasonic energy with the enlarged portions spaced from the base plate to overlay the softened plastic and causing said softened plastic material to set and form an integral welded joint.

2. In the process of claim 1 wherein said plate and strap are formed of polysulfone.

3. The method as set forth in claim 1 wherein said ultrasonic vibratory energy is applied to the surfaces until preselected clamp-up pressure is created across the members.

4. In the method of claim 1 wherein a plurality of said straps are secured to said plate in spaced relation along the length of said glass tube.

* * * * *

UNITED STATES PATENT AND TRADEMARK OFFICE

CERTIFICATE OF CORRECTION

PATENT NO. : 4,144,109

DATED : March 13, 1979

INVENTOR(S) : Gordon J. Waligorski

It is certified that error appears in the above-identified patent and that said Letters Patent are hereby corrected as shown below:

| | | | | |
|---|---|---|---|---|
| Column | 1, | Line | 45, | after "adversely" cancel "effected" and insert --- affected ---; |
| Column | 2, | Line | 25, | after "to" cancel "overly" and insert --- overlie ---; |
| Column | 2, | Line | 45, | after "an" cancel "esthetically" and in-sert --- aesthetically ---; |
| Column | 3, | Line | 27, | after "otherwise" cancel "adversily" and insert --- adversely ---; |
| Column | 3, | Line | 49, | after "must" cancel "accomodate" and insert --- accommodate ---; |
| Column | 4, | Line | 52, | after "The" cancel "extend" and insert --- extent ---; |
| Column | 5, | Line | 29, | after "as" cancel "pre-sntly" and insert --- presently ---; |

UNITED STATES PATENT AND TRADEMARK OFFICE

CERTIFICATE OF CORRECTION

PATENT NO. : 4,144,109

DATED : March 13, 1979

INVENTOR(S) : Gordon J. Waligorski

It is certified that error appears in the above-identified patent and that said Letters Patent are hereby corrected as shown below:

Column 6, Line 15, CLAIM 1 after "relation" cancel "in";

Column 6, Line 20, CLAIM 1 after "said" cancel "support" and insert --- strap ---;

Column 6, Line 21, CLAIM 1 after "said" cancel "stud" and insert --- studs ---;

Signed and Sealed this

*Fourteenth* Day of *August 1979*

[SEAL]

*Attest:*

LUTRELLE F. PARKER

*Attesting Officer* *Acting Commissioner of Patents and Trademarks*